US008523506B2

(12) United States Patent
MacDonald et al.

(10) Patent No.: US 8,523,506 B2
(45) Date of Patent: Sep. 3, 2013

(54) CABLE STAPLE

(76) Inventors: Brian MacDonald, St-Jean-sur-richelieu (CA); Daniel Lalancette, St-Jean-sur-richelieu (CA); Mike Di Lillo, Chambly (CA)

(*) Notice: Subject to any disclaimer, the term of this patent is extended or adjusted under 35 U.S.C. 154(b) by 328 days.

(21) Appl. No.: 12/855,118

(22) Filed: Aug. 12, 2010

(65) Prior Publication Data

US 2011/0038689 A1 Feb. 17, 2011

Related U.S. Application Data

(60) Provisional application No. 61/233,883, filed on Aug. 14, 2009.

(51) Int. Cl.
*F16B 15/00* (2006.01)

(52) U.S. Cl.
USPC ............. 411/457; 411/475; 411/921; 248/71; 174/159

(58) Field of Classification Search
USPC ........... 411/457, 461, 473–475, 921; 248/49, 248/68.1; 174/159
See application file for complete search history.

(56) References Cited

U.S. PATENT DOCUMENTS

| | | | |
|---|---|---|---|
| 314,848 A * | 3/1885 | James | 428/223 |
| 717,270 A * | 12/1902 | Rapson | 411/470 |
| 1,023,837 A * | 4/1912 | Gilmore | 411/457 |
| 1,774,867 A * | 9/1930 | Booth | 411/470 |
| 1,841,353 A * | 1/1932 | Boggess | 411/475 |
| 2,284,422 A * | 5/1942 | Hall | 52/716.5 |
| 2,317,825 A | 4/1943 | Teas, Sr. | |
| 2,564,176 A * | 8/1951 | Rubiee | 174/159 |
| 2,596,181 A * | 5/1952 | Soderberg et al. | 411/461 |
| 2,620,705 A * | 12/1952 | Papa et al. | 411/460 |
| 2,885,168 A | 5/1959 | Silverman | |
| 3,231,076 A | 1/1966 | Freiman | |
| 3,363,864 A | 1/1968 | Olgreen | |
| 3,618,447 A * | 11/1971 | Goins | 411/456 |
| 3,869,957 A * | 3/1975 | Barth et al. | 411/447 |
| 4,219,174 A | 8/1980 | Whitehouse | |
| 4,458,387 A * | 7/1984 | Pearson | 24/101 B |
| 5,090,645 A | 2/1992 | Zuercher | |
| 5,141,185 A | 8/1992 | Rumbold et al. | |
| 5,188,318 A | 2/1993 | Newcomer et al. | |
| 5,189,766 A | 3/1993 | Weber | |
| 5,223,675 A | 6/1993 | Taft | |
| 6,113,332 A | 9/2000 | Hill | |
| 6,435,792 B1 * | 8/2002 | Farris et al. | 411/466 |
| 7,071,418 B2 | 7/2006 | Brockman et al. | |
| 7,207,150 B2 * | 4/2007 | Leek et al. | 52/747.1 |

* cited by examiner

*Primary Examiner* — Flemming Saether
(74) *Attorney, Agent, or Firm* — Snyder, Clark, Lesch & Chung, LLP

(57) ABSTRACT

Consistent with embodiments described herein, a one-piece staple for affixing electrical or communications wires or staples includes a body portion and at least three leg elements extending from the body portion. The first leg element and the second leg element define a first cable receiving area, and the second leg element and the third leg element define a second cable receiving area. The at least three leg elements are configured for secure insertion into a structural support element.

18 Claims, 4 Drawing Sheets

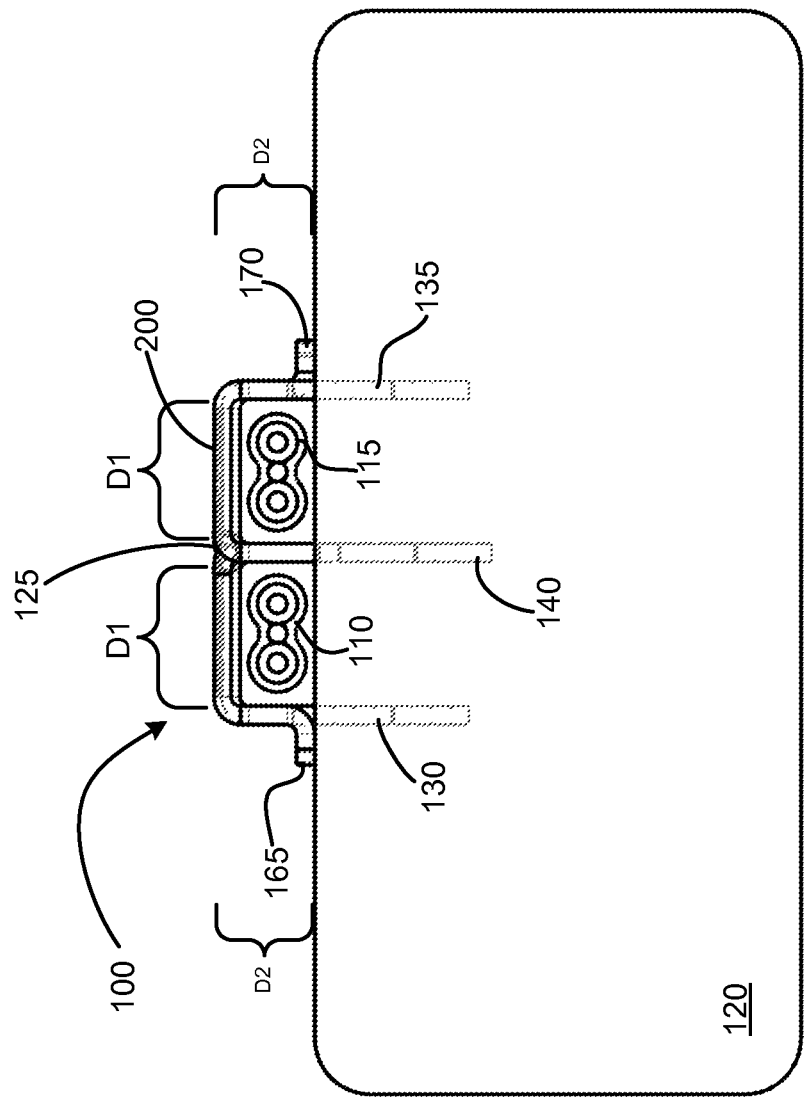

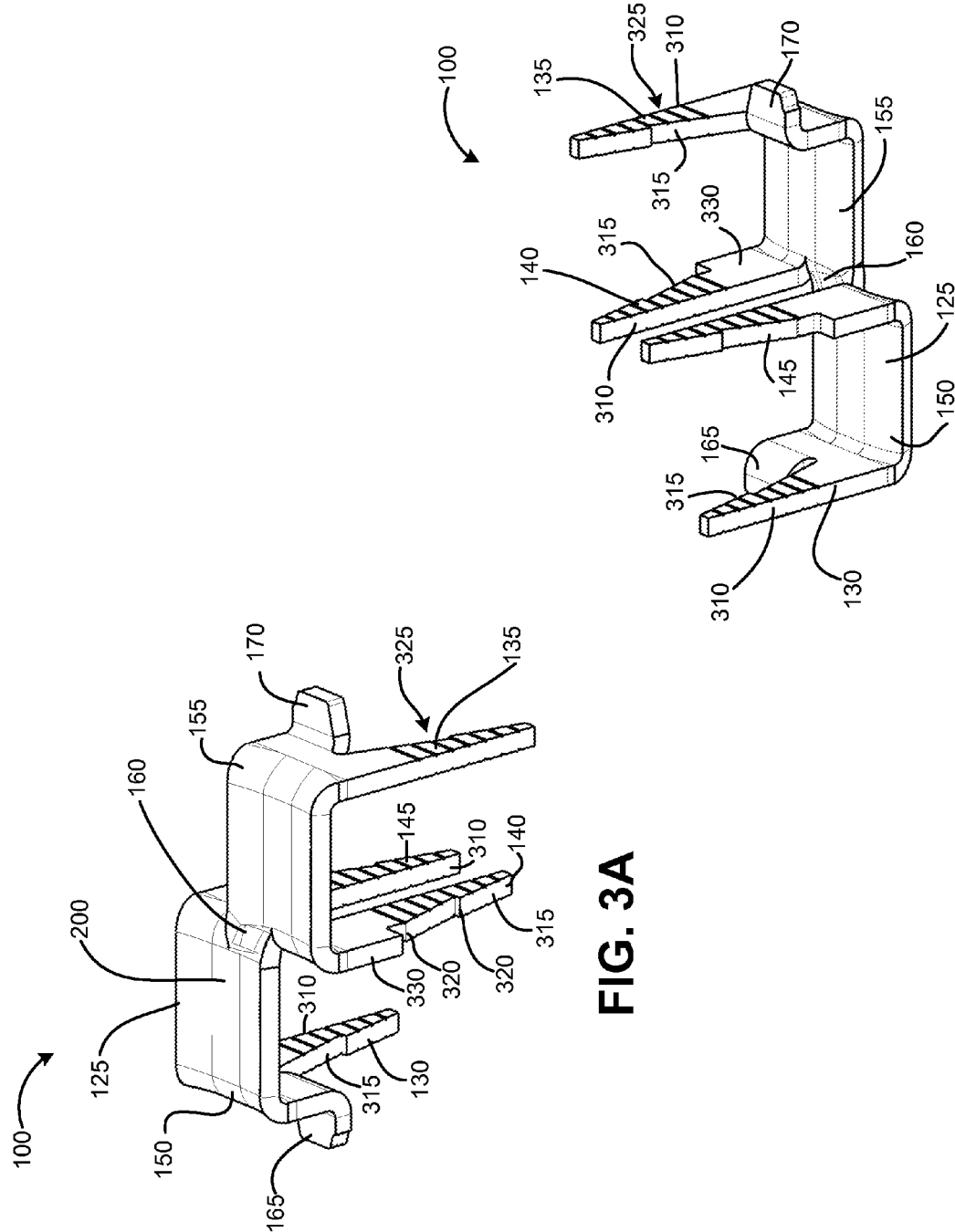

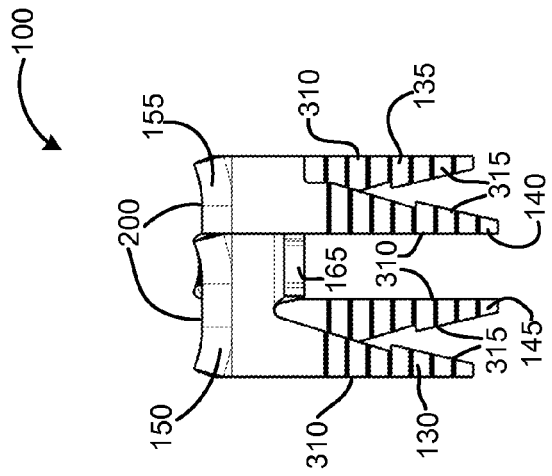
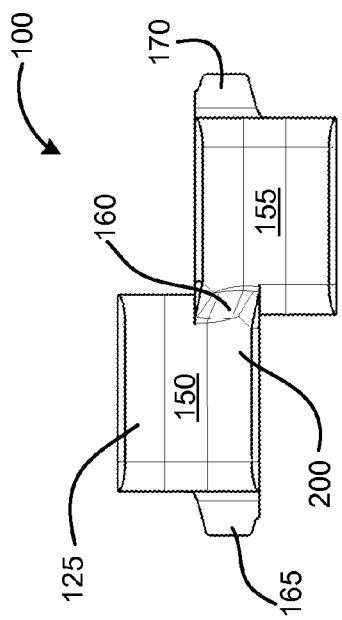
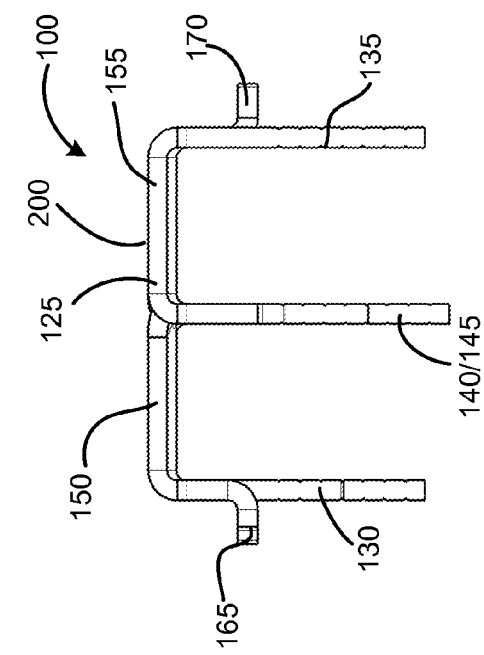
FIG. 4A
FIG. 4B
FIG. 4C

CABLE STAPLE

CROSS-REFERENCE TO RELATED APPLICATION

This application claims priority under 35. U.S.C. §119, based on U.S. Provisional Patent Application No. 61/233,883 filed Aug. 14, 2009, the disclosure of which is hereby incorporated by reference herein.

BACKGROUND OF THE INVENTION

The present invention relates to fasteners and, more specifically to wire/cable management devices and, more particularly, to staple-type fasteners configured to secure electrical or communications cables to structural support members.

Similar to conventional paper staples, cable or wire staples typically include a crown portion connected to two pointed leg members that extend perpendicularly away from the crown portion. During installation, the leg members are placed on either side of a cable or wire and the pointed ends are driven into the stud or other structural member that the cable is being affixed to. Depending on the type of installation and applicable building requirements, cable staples may include insulated elements.

Furthermore, jurisdictional building codes in many areas may require that building wire or cables be secured at prescribed intervals using appropriately sized staples meeting certain requirements. The right size and type of staple or wire management device may depend on the type, number, and gauge of wires in the cable. If the staples are too narrow for the cable, the sheathing or the wire conductor or insulation could be cut when the staples are installed, and if they are too large, they may not sufficiently clamp the cable in place.

BRIEF DESCRIPTION OF THE DRAWINGS

FIG. 2 is an enlarged, cross-sectional view of the electrical cable staple of FIG. 1;

FIGS. 3A and 3B are enlarged isometric top and bottom perspective views of the cable staple of FIG. 1; and FIGS. 4A-4C are top, front, and side plan views, respectively, of the cable staple of FIG. 1.

DETAILED DESCRIPTION OF THE PREFERRED EMBODIMENTS

Figure 1:
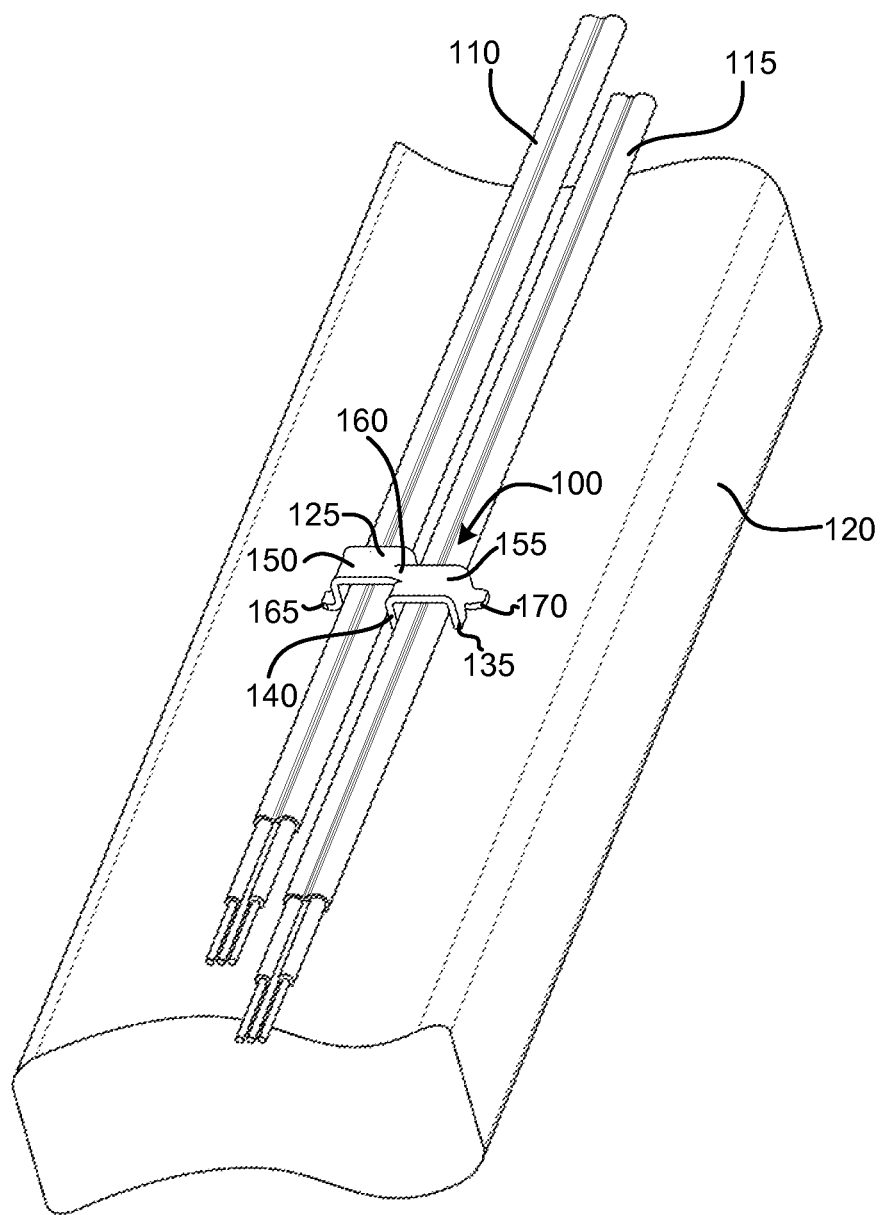
FIG. 1 is a schematic isometric diagram illustrating an electrical cable staple consistent with embodiments described herein.

The following detailed description refers to the accompanying drawings. The same reference numbers in different drawings may identify the same or similar elements.

FIG. 1 is a schematic isometric diagram illustrating an electrical cable staple 100 consistent with embodiments described herein. As shown in FIG. 1, electrical cable staple 100 may be configured to secure two separate electrical cables 110/115 to a structural element 120, such as a wall stud, a floor joist, a truss, etc. As illustrated in FIG. 1, and described more specifically below in relation to FIGS. 2-4C, electrical cable staple 100 may include a one-piece body 125. In one implementation, one piece body 125 may have four depending leg elements 130, 135, 140, and 145. It is noted that leg elements 130 and 145 are not visible in FIG. 1, and are shown in FIGS. 3A, 3B, and 4C. Leg elements 130-145 may be configured for forcible insertion into structural element 120, e.g., via a hammer or other suitable tool.

In one exemplary implementation, one-piece body 125 may include an offset configuration having a first body portion 150 and a second body portion 155 joined together via an intermediate body portion 160. In this configuration, leg elements 130 and 145 (not shown in FIG. 1) may project from first body portion 150 in a substantially perpendicular manner. Similarly, leg elements 135 and 140 may project from second body portion 155 in a substantially perpendicular manner. During installation, electrical cable 110 may be positioned in a cable receiving area between leg elements 130 and 145 and electrical cable 115 may be positioned in a cable receiving area between leg elements 135 and 140. Cable staple 100 may be driven into support element 120, e.g., by a hammer or similar tool, thereby securing electrical cables 110/115 to support structure 120.

In an exemplary implementation, one-piece body 125 may be formed of a metal or other castable material. In other implementations, one-piece body 125 may be formed of a plastic, resin, or other moldable material. Additional details relating to leg elements 130-145 are described below in relation to FIGS. 3A and 4C.

Electrical cable staple 100 may also include flange members 165 and 170 (also referred to as spacing members 165/170) that extend outwardly from opposing sides of one-piece body 125. The location and spacing of flange members 165/170 may prevent over-insertion of electrical cable staple 100 into structural element 120, thereby preventing or minimizing damage to electrical cables 110/115 during installation of electrical cable staple 100. Additional details relating to flange members 165 and 170 are described below in relation to FIG. 2.

FIG. 2 is an enlarged, cross-sectional view of electrical cable staple 100 upon installation in structural element 120. As shown in FIG. 2, leg elements 130-145 may extend or project from one-piece body 125 into structural element 120. The location of leg elements 130-145 on one-piece body 125 may be spaced such that leg elements 130 and 145 (located behind leg element 140 in FIG. 2) are spaced apart by a distance "D1" and leg elements 135 and 140 are similarly spaced apart by distance "D1." In one implementation, distance "D1" may substantially correspond to a width of electrical cables 110/115, with different distances corresponding to different width cables. Further, the space between legs 130 and 145 may be different that the space between legs 135 and 140, thereby providing a once-piece cable staple accommodating two differently sized cables.

The length of leg elements 130-145 may be sufficient to enable secure fastening to structural element 120. As will be described in additional detail below, features of leg elements 130-145 may further encourage adequate fastening of leg elements 130-145 to structural element 120.

As described above, flange members 165/170 may be configured to engage an upper surface of structural element 120 and prevent over-insertion of leg elements 130-145 into structural element 120. As illustrated in FIGS. 1 and 2, flange member 165 may extend outwardly from first body portion 150 at a depth "D2" from an upper surface 200 of one-piece body 125. Similarly, flange member 170 may extend outwardly from second body portion 155 at depth "D2." This configuration forms a substantially s-shaped configuration, when viewed from a plan or cross-sectional view. In one implementation, flange members 165 and 170 may be positioned at different depths relative to upper surface 200 to accommodate differently sized electrical cables or wires, such as wires having different diameters or thicknesses.

FIGS. 3A and 3B are isometric top and bottom views, respectively, of electrical cable staple 100. FIGS. 4A-4C illustrate top, plan, and end views of electrical cable staple 100. As shown in FIGS. 3A, 3B, and 4C, upper surface 200 of one-piece body 125 may include a contoured surface. In one embodiment, upper surface 200 may be scalloped, convex, or dished out, such that a center portion of the upper surfaces 200 of first body portion 150 and second body portion 155 has a depth lower than outer portions of the upper surfaces 200 of first body portion 150 and second body portion 155.

As further illustrated in FIGS. 3A and 3B, leg elements 130-145 may include an tapered or barbed configuration terminating in a point or substantially pointed end. More specifically, each of leg elements 130-145 may include a flat edge 310 and a barbed edge 315. Barbed edge 315 may include two or more barbs 320. In addition, leg elements 130-145 may include textured surfaces 325 on side surfaces thereof. For example, textured surfaces 325 may include a plurality of relatively shallow, parallel grooves formed in side surfaces of each of leg elements 130-145. Alternatively, textured surfaces 325 may include a pebbled, dimpled, ridged, or rippled configuration for increasing a surface area of leg elements 130-145. Barbs 320 and surface grooves 325 may be provided to increase a holding strength of leg elements 130-145 in structural elements 120.

Leg elements 130 and 135 may have a first length and central leg elements 140 and 145 may have a second length. In one exemplary embodiment, the first length of leg elements 130 and 135 may be different than the second length of central leg elements 140 and 145. More specifically, the second length may be longer than the first length. Central leg elements 140 and 145 may also include an upper spacer portion 330 having an increased width relative to barbs 320 formed therein. A lower edge of upper spacer portion 330 may be positioned at depth "D2" so that upper spacer portion 330 may further assist in preventing over-insertion of leg elements 140 and 145 into structural element 120.

Although FIGS. 3A, 3B, and 4C depict an implementation having four distinct leg elements 130-145, cable staple 100 consistent with embodiments described herein may have fewer than four leg elements. For example, central leg elements 140 and 145 may be formed as a single leg element extending from intermediate body portion 160.

In other implementations, cable staple 100 may include additional body portions and leg elements for supporting additional electrical cables. For example, a third offset body portion may extend adjacently to second body portion 155 in a manner similar to that in which second body portion 155 extends from first body portion 150. In such an embodiment, additional leg elements and an additional flange member may extend from the third body portion.

The above-described embodiments facilitate secure and effective attachment of electrical cables or wires to support structures by providing a one-piece staple having at least three distinct leg members extending from a body portion, with a first cable being supported between the first and second leg members, and the second cable being supported between the second and third leg members. The leg members may be provided with textured and/or barbed surfaces for securely engaging the support structure upon insertion therein.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, a cable staple consistent with embodiments described herein may include additional body portions and leg elements for supporting more than two electrical cables.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A one-piece cable staple, comprising:
a body portion; and
consisting of first, second, third, and fourth leg elements extending from the body portion,
wherein the second leg element is spaced from the fourth leg element and projects from the body portion in a common plane with the fourth leg element,
wherein the first leg element and the second leg element project from the body portion in a second plane that is perpendicular to the common plane,
wherein the third leg element and the fourth leg element project from the body portion in a third plane that is perpendicular to the common plane,
wherein the first leg element and the second leg element define a first cable receiving area, and the third leg element and fourth leg element define a second cable receiving area,
wherein the first, second, third, and fourth leg elements are configured for secure insertion into a structural support element.

2. The one-piece cable staple of claim 1, wherein the first, second, third, and fourth leg elements each include a barbed configuration.

3. The one-piece cable staple of claim 1, wherein the first, second, third, and fourth leg elements each include a textured surface.

4. The one-piece cable staple of claim 3, wherein the textured surface comprises a ridged surface, a rippled surface, a pebbled surface, or a dimpled surface.

5. The one-piece cable staple of claim 1, wherein the first, second, third, and fourth leg elements project substantially perpendicularly from the body portion.

6. The one-piece cable staple of claim 1, further comprising:
a flange member projecting from the body portion, the flange member configured to prevent over-insertion of the first, second, third, and fourth leg elements into the structural support element.

7. The one-piece cable staple of claim 6, wherein the flange member comprises a first flange member extending from a first side of the body portion and a second flange member extending from a second side of the body portion.

8. The one-piece cable staple of claim 6, wherein the flange member comprises a first portion projecting perpendicularly from the body portion and a second portion projecting perpendicularly from the first portion.

9. The one-piece cable staple of claim 1, wherein the body portion comprises a curved upper surface.

10. The one-piece cable staple of claim 1, wherein the body portion comprises a first body portion corresponding to the first cable receiving area and a second body portion corresponding to the second cable receiving area,
  wherein the first body portion and the second body portion are connected via an intermediate body portion,
  wherein the second body portion is offset with respect to the first body portion, and
  wherein the second body portion is parallel to the first body portion.

11. The one-piece cable staple of claim 10,
  wherein the first leg element and the second leg element project from the first body portion, and the third leg element and the fourth leg element project from the second body portion.

12. The one-piece cable staple of claim 11, wherein a length of the second leg element and the fourth leg element is longer than a length of the first leg element and the third leg element.

13. The one-piece cable staple of claim 10, wherein the second leg element and the fourth leg element each include a spacer portion having an increased width relative to a remainder of the leg element.

14. A cable staple for securing at least two electrical cables to a support element, comprising;
  a body portion;
  a first leg element projecting from the body portion;
  a second leg element projecting from the body portion, wherein a space formed between the first leg element and the second leg element defines a first cable receiving area;
  a third leg element projecting from the body portion, wherein a space formed between the second leg element and the third leg element defines a second cable receiving area,
  a fourth leg element projecting from the body portion adjacent to the second leg element,
  wherein a space formed between the fourth leg element and the third leg element defines the second cable receiving area, and
  wherein a first plane that includes the first and second leg elements is offset from a second plane that includes the third and fourth leg elements,
  wherein the first plane and the second plane are perpendicular to a common plane formed by the fourth leg element and the second leg element,
  wherein the first leg element, the second leg element, and the third leg element, and the fourth leg element are configured for insertion into the support element; and
  a spacing member projecting from the body portion and configured to prevent over-insertion of the first, second, and third leg elements into the support element.

15. The cable staple of claim 14, wherein the body portion comprises a first body portion and a second body portion connected to the first body portion via an intermediate body portion,
  wherein the first and second leg elements project from the first body portion and the third and fourth leg elements project from the second body portion.

16. The cable staple of claim 14, wherein the first, second, and third leg members comprise a tapered configuration terminating in a substantially pointed end opposite from the body portion.

17. The cable staple of claim 14, wherein the spacing member comprises a flange extending from the body portion at a particular depth from an upper surface of the body portion, wherein the particular depth substantially corresponds to a diameter of at least one of the at least two electrical cables.

18. A one piece staple for affixing electrical or communication cables or wires to a support element, comprising:
  a first body portion;
  a second body portion connected to the first body portion by an intermediate body portion;
  a first leg element projecting from the first body portion;
  a second leg element projecting from the first body portion proximate to the intermediate body portion,
  wherein a space formed between the first leg element and the second leg element defines a first cable receiving area;
  a third leg element projecting from the second body portion proximate to the intermediate body portion;
  a fourth leg element projecting from the second body portion,
  wherein a space formed between the fourth leg element and the third leg element defines a second cable receiving area; and
  at least one flange member projecting from at least one of the first body portion or the second body portion, the at least one flange member configured to prevent over-insertion of the first, second, third, and fourth leg elements into the support element during installation,
  wherein the at least one flange member comprises a first portion projecting perpendicularly from the first body portion and a second portion projecting perpendicularly from the first portion.

* * * * *

UNITED STATES PATENT AND TRADEMARK OFFICE
CERTIFICATE OF CORRECTION

| | | |
|---|---|---|
| PATENT NO. | : 8,523,506 B2 | Page 1 of 1 |
| APPLICATION NO. | : 12/855118 | |
| DATED | : September 3, 2013 | |
| INVENTOR(S) | : MacDonald et al. | |

It is certified that error appears in the above-identified patent and that said Letters Patent is hereby corrected as shown below:

On the title page insert item (73), the name of the Assignee was omitted from Issue Fee Form. The Assignee should designate --Thomas & Betts International, Inc., of Wilmington, DE--.

Signed and Sealed this
Twenty-ninth Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,523,506 B2  
APPLICATION NO. : 12/855118  
DATED : September 3, 2013  
INVENTOR(S) : MacDonald et al.

Page 1 of 1

It is certified that error appears in the above-identified patent and that said Letters Patent is hereby corrected as shown below:

On the title page, "item (76)" should read -- item (75) --.

On the title page insert item (73), the name of the Assignee was omitted from Issue Fee Form. The Assignee should designate -- Thomas & Betts International, Inc., of Wilmington, DE --.

This certificate supersedes the Certificate of Correction issued April 29, 2014.

Signed and Sealed this  
Twentieth Day of May, 2014

Michelle K. Lee  
*Deputy Director of the United States Patent and Trademark Office*